US011838759B2

(12) United States Patent
Draznin et al.

(10) Patent No.: US 11,838,759 B2
(45) Date of Patent: *Dec. 5, 2023

(54) SERVICE DEFINITION FOR PRIVATE NETWORKS BASED ON ENHANCED PLMN IDENTIFIERS

(71) Applicant: Verizon Patent and Licensing Inc., Basking Ridge, NJ (US)

(72) Inventors: Sagiv Draznin, Walnut Creek, CA (US); Patricia R. Chang, San Ramon, CA (US); Lalit R. Kotecha, San Ramon, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,683

(22) Filed: Nov. 15, 2022

(65) Prior Publication Data

US 2023/0074832 A1    Mar. 9, 2023

Related U.S. Application Data

(63) Continuation of application No. 16/582,429, filed on Sep. 25, 2019, now Pat. No. 11,528,608.

(51) Int. Cl.
*G06F 7/04* (2006.01)
*H04W 12/08* (2021.01)
*H04W 76/11* (2018.01)
*H04W 60/00* (2009.01)
*H04W 12/72* (2021.01)
*H04W 84/04* (2009.01)

(52) U.S. Cl.
CPC ........... *H04W 12/08* (2013.01); *H04W 12/72* (2021.01); *H04W 60/00* (2013.01); *H04W 76/11* (2018.02); *H04W 84/042* (2013.01)

(58) Field of Classification Search
CPC ..... H04W 12/08; H04W 12/72; H04W 76/11; H04W 60/00
USPC ........................................................ 726/2
See application file for complete search history.

(56) References Cited

U.S. PATENT DOCUMENTS

| 2016/0219114 | A1* | 7/2016 | Keyani | ................ G06Q 20/204 |
| 2018/0262941 | A1* | 9/2018 | Huang | .................... H04L 43/08 |
| 2019/0199532 | A1* | 6/2019 | Zhang | .................. H04L 9/3273 |

* cited by examiner

*Primary Examiner* — Jeffrey C Pwu
*Assistant Examiner* — Samuel Ambaye (57) ABSTRACT

A method for performing service authorization for private networks based on an enhanced PLMN identifier. The method includes receiving an attach request from a user equipment device (UE) via a private network, where the attach request includes an international mobile subscriber identity value (IMSI). The method further includes determining, based on the IMSI, an organization identifier and a token associated with the private network, where the token is included in an enhanced PLMN for granting the UE access to resources in the private network. The method further includes sending the token to the UE and a network proxy within the private network.

20 Claims, 8 Drawing Sheets

SERVICE DEFINITION FOR PRIVATE NETWORKS BASED ON ENHANCED PLMN IDENTIFIERS

RELATED APPLICATION

The patent application is a continuation of U.S. patent application Ser. No. 16/582,429 filed on Sep. 25, 2019, titled "SERVICE DEFINITION FOR PRIVATE NETWORKS BASED ON ENHANCED PLMN IDENTIFIERS," the disclosure of which is hereby incorporated by reference herein in its entirety.

BACKGROUND

Service providers are deploying private networks utilizing configurable cloud-based wide area network (WAN) services. A private networking environment may be complex and have multiple locations and/or data centers. Management of subscriber services in private networks can be time-consuming, given the ever-increasing number of applications, user-types, sites, and devices proliferating throughout an organization. Conventional administration and access control for private networks may rely upon provider networks (e.g., mobile network operator (MNO)) for various aspects of network management. As private networks grow and become more sophisticated, reliance upon provider networks for administrative tasks may reduce efficiency and impact overall network performance.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Private networks employing cellular wireless standards provide a compelling and reliable solution for connectivity. As a result, customers deploying private networks are applying broadband cellular network standards, such as Long Term Evolution (LTE) and fifth generation (5G) standards, to private wireless networks using unlicensed or shared radio frequency (RF) spectrum. The low transmit power required for signals in unlicensed or shared spectrum permits relatively dense placement of small private network cells. User equipment devices (UEs) may be configured to access the private network, a provider network (e.g., a mobile network operator (MNO) network), or both networks.

Given the ever-increasing number of applications, user-types, sites, and devices proliferating throughout an organization, management of users' services can be complex and time-consuming. For example, users may be associated with different combinations of user groups (e.g., employer, customer, department, organization, etc.), applications (e.g., social media, voice-over-IP, video streaming, machine-type communications, etc.), and/or services (e.g., location determination, advertising, mobile edge computing (MEC) access, cloud computing, MNO access, etc.). Implementations described herein simplify access control and the provisioning of users by having private networks administer resources within the private network. Having the private network provide resource authorization without interacting with the provider network can improve efficiencies and reduce congestion for both private and provider networks.

Embodiments described herein are directed to wireless communications systems which perform service definition and/or authorization for private networks based on enhanced public land mobile networks identifiers (PLMNs). According to implementations described herein, during an initial attach to a provider network, a UE may receive one or more tokens which may be used for enhanced PLMNs. The enhanced PLMNs can then be used when the UE joins (e.g., attaches) to a private network. The private network may then define and authorize access to particular resources within the private network based on the tokens, without having to rely upon the provider network.

Figure 1:
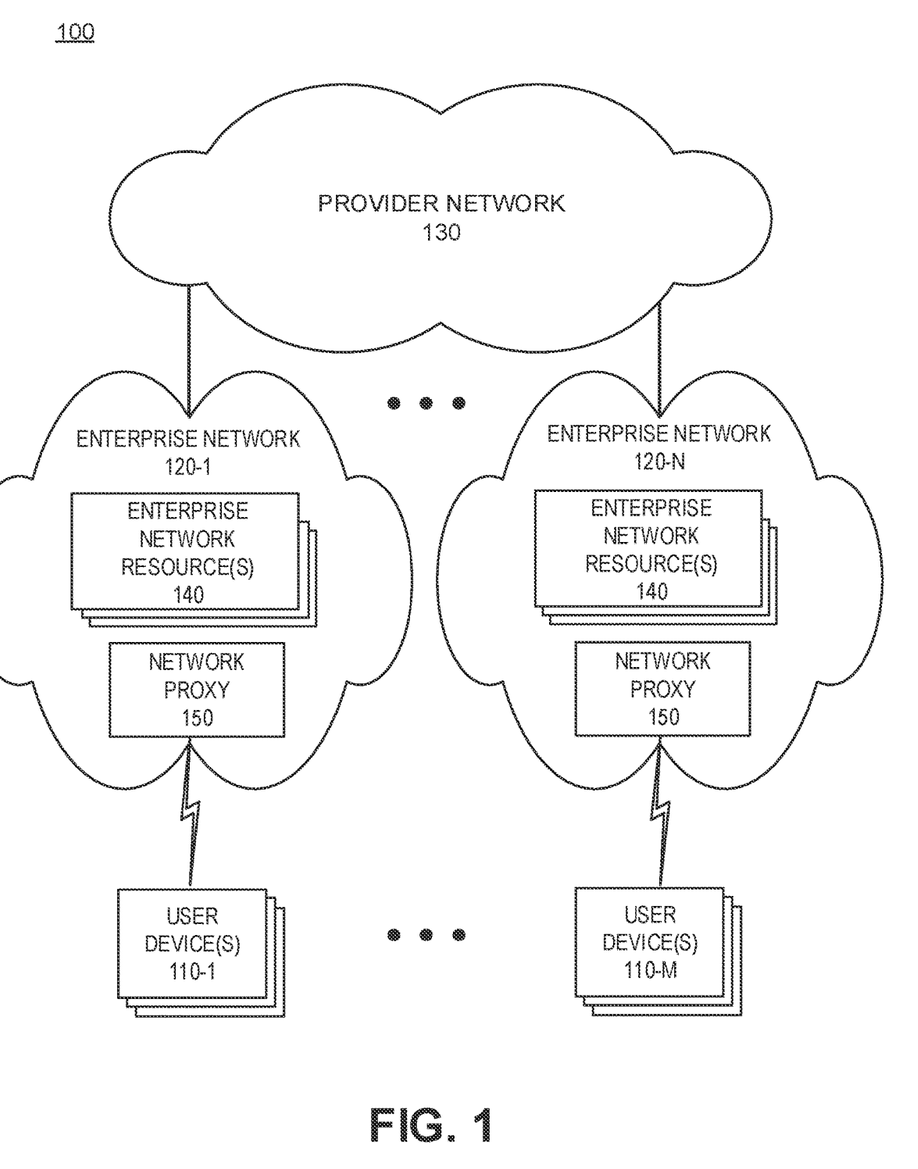
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include user equipment devices (UEs) 110-1 through 110-M (referred to herein generically as UE 110), one or more private networks, which are shown in this embodiment as enterprise networks 120-1 through 120-N (referred to herein generically as enterprise network 120), and a service provider network 130 (also referred to herein as "provider network"). Environment 100 includes links between the networks and between devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary. According to other embodiments, environment 100 may include additional networks, fewer networks, and/or different types of networks than those illustrated and described herein.

A private network may be embodied as enterprise network 120 which is operated by an organization (e.g., company, non-profit entity, government agency, etc.) for use in furtherance of its objectives. Enterprise network 120 which may include a local area network (LAN), a wide area network (WAN), or a combination of networks. Enterprise network 120 may provide network access to resources in provider network 130 and/or serve as a stand-alone network.

Different enterprise networks 120-1 through 120-N may have different organization identifiers (orgIDs) indicating the sponsoring organization.

In one implementation, enterprise network 120 may include enterprise network resources 140 and network proxy 150. UE 110 may communicate with enterprise network 120 via network proxy 150 to access enterprise network resources 140 and/or communicate with provider network 130. Enterprise network resources 140 may include network devices that may provide: data services; voice services; location services (e.g., user position determination), marketing services (e.g., digital coupons), and/or video services. Enterprise network resources 140 may include security systems for access control to secure devices and/or restricted areas. Enterprise network resources 140 may provide access to infrastructure network devices in enterprise network 120. Access to enterprise network resources 140 may be performed via network proxy 150. In an embodiment, network proxy 150 may grant or deny UE 110 access to enterprise network resources 140 based on tokens provided by UE 110. Network proxy 150 may further provide other networking functionality, such as, for example, various network devices, secure gateways, routers, to interconnect enterprise network 140 with UE 110. Network proxy 150 may include networking devices for communicating with UE 110 based on any wireless protocol, which may include 4G, 5G, WiFi, etc.

According to various exemplary embodiments, enterprise network 120 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, enterprise network 120 may be implemented according to various wireless technologies (e.g., radio access technology (RAT), etc.), wireless standards (e.g., 802.11x Wi-Fi), wireless frequencies/bands/carriers, licensed radio spectrum, unlicensed radio spectrum, and/or any other attributes of radio communication. For example, enterprise network 120 may include one or multiple types of network devices for various types of access, such as a next generation Node B (gNB), an evolved Node B (eNB), an evolved LTE (eLTE) eNB, a radio network controller (RNC), a remote radio head (RRH), a baseband unit (BBU), a small cell node (e.g., a picocell device, a femtocell device, a microcell device, a home eNB, a repeater, etc.), a Wi-Fi access point, or another type of wireless node.

According to an exemplary embodiment, network proxy 150 may include an authentication proxy providing authentication services as described herein. Network proxy 150 may communicate with provider network 130 and/or cache core network functionality to allow enterprise network 120 to benefit from core functionality of provider network 130 and perform service definition and management. For example, network proxy 150 may implement an Extensible Authentication Protocol (EAP) authentication server and may store authentication tokens for UEs 110. Additionally, or alternatively, network proxy 150 may authenticate a particular UE 110 based on a customer device identity, international mobile subscriber identity (IMSI).

Provider network 130 may include one or multiple networks of one or multiple types and technologies associated with an MNO. According to an exemplary embodiment, provider network 130 includes a network to connect and manage different parts of enterprise network 120. For example, provider network 130 may be implemented to include a 5G core network (also referred to as a next generation core (NGC) network), an evolved packet core (ePC) of an LTE network, a core network of an LTE-Advanced (LTE-A) network, and/or a core network of an LTE-A Pro network. Provider network 130 may also include a legacy core network. Details of provider network 130 are described below in reference to FIGS. 2 and 3.

UE 110 includes a device that has computational and wireless communication capabilities. Depending on the implementation, UE 110 may be a mobile device, a portable device, a stationary device, a device operated by a user, or a device not operated by a user. For example, UE 110 may be implemented as a smartphone, a personal digital assistant, a tablet, a netbook, a wearable device (e.g., a watch, glasses, etc.), a set top box, an infotainment system in a vehicle, a vehicle support system, a smart television, a game system, a music playing system, or other types of wireless customer devices. By way of further example, UE 110 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a UE 110, or other types of wireless end node. UE 110 may be configured to execute various types of software (e.g., applications, programs, etc.). The number and the types of software may vary among UEs 110.

UE 110 may support one or multiple radio access technologies (RATs, such as, 4G, 5G, etc.) and various portions of the radio spectrum (e.g., multiple frequency bands, multiple carrier frequencies, licensed, unlicensed, etc.), network slicing, and/or other types of connectivity services. Additionally, UE 110 may include one or multiple communication interfaces that provide one or multiple (e.g., simultaneous) connections via the same or different RATs, frequency bands, carriers, network slices, and so forth. The multimode capabilities of UE 110 may vary among UEs 110.

According to an exemplary embodiment, UE 110 may be provisioned (e.g., via a subscriber identity module (SIM) card or another secure element) to recognize particular network identifiers (e.g., associated with other networks or RANs) and to support particular radio frequency (RF) spectra.

Figure 2:
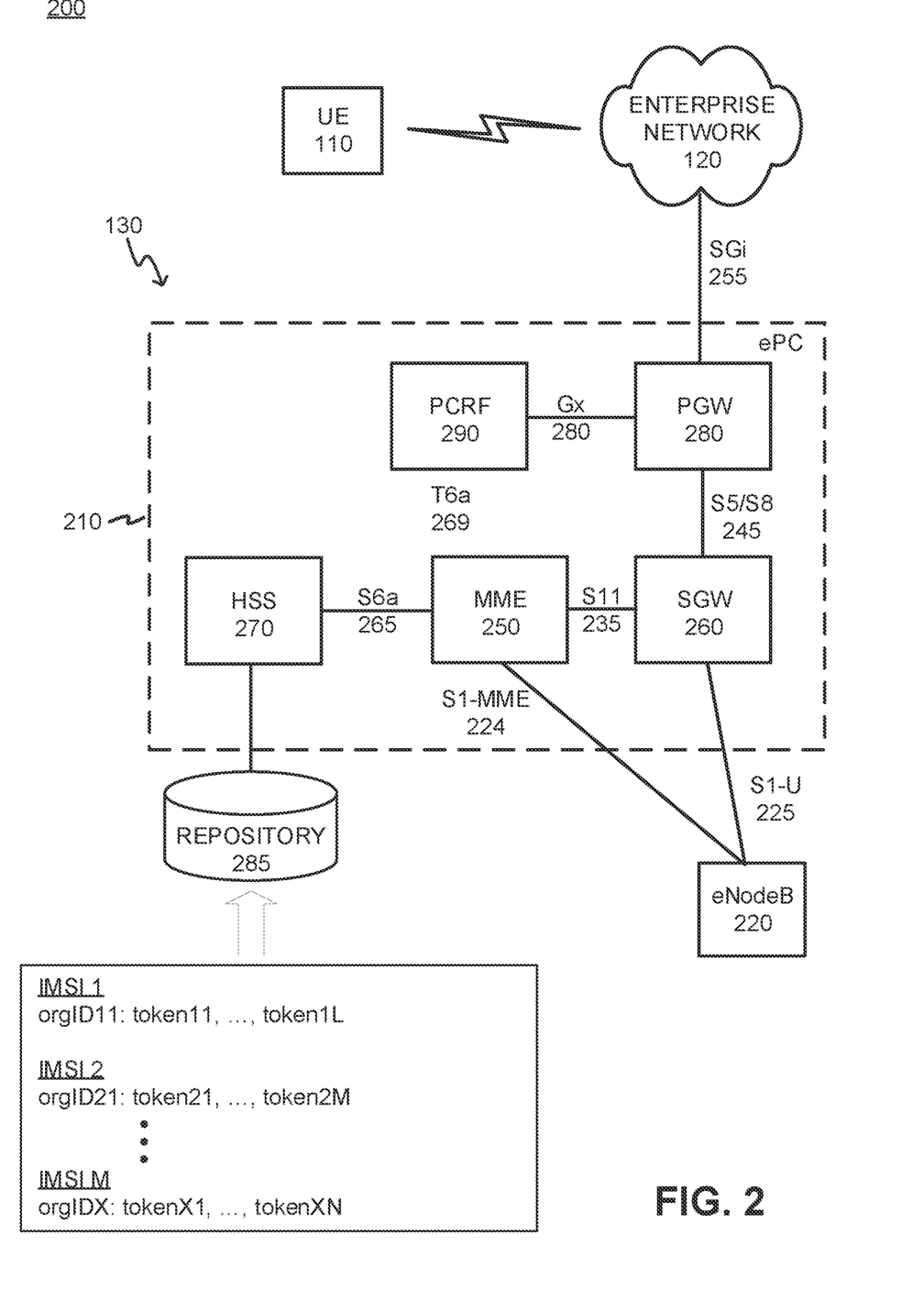
FIG. 2 is a block diagram of an exemplary system having a provider network based on an LTE standard.

FIG. 2 is a block diagram of an exemplary networking system 200 including provider network 130 based on the LTE standard. Provider network 130 may include an LTE network with an evolved Packet Core (ePC) 210 and eNodeB 220. In the embodiment shown in FIG. 2, UE 110 may wirelessly connect with enterprise network 120 to exchange data over a radio access technology (RAT) based on LTE air channel interface protocols. Provider network 130 may include an evolved Universal Mobile Telecommunications System (UMTS) Terrestrial Network (eUTRAN) that includes at least one eNodeB 220. UE 110 may also connect wirelessly with eNodeB 220 over a RAT based on LTE air channel interface protocols. Networking system 200 may further include an Internet Protocol (IP) network and/or a non-IP network, which may be embodied separately or included in a WAN and/or backhaul network (not shown). EPC 210 may also be connected to a repository 285 which may store tokens and organization identifiers (orgIDs) associated with international mobile subscriber identities (IMSIs) of UEs 110.

EPC 210 may include one or more devices that are physical and/or logical entities interconnected via standardized interfaces. EPC 210 provides wireless packet-switched services and wireless packet connectivity to UEs 110 to provide, for example, data, voice, and/or multimedia services. EPC 210 may further include a mobility management entity (MME) 250, a serving gateway (SGW) 260, a home subscriber server (HSS) 270, a packet data network gateway (PGW) 280, and a Policy and Charging Rules Function (PCRF) 290. FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 225 may be implemented, for example, using general packet radio services tunneling protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for provider network 130. For example, through eNodeB 220, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs 110 serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to enterprise network 120 and/or a wide area network (WAN) (not shown) through a SGi interface 255. Enterprise network 120 may provide various services (e.g., over the top voice services) to UE 110. A particular UE 110, while connected to a single SGW 260, may be connected to multiple PGWs 280, one for each packet network with which UE 110 communicates.

As shown in the embodiment of FIG. 1, UE 110 may exchange data with enterprise network 120 through any wireless communications protocol. The protocols may include cellular standards such as, for example, 4G, 5G, LTE, etc. Additionally or alternatively, UE 110 may wireless communicate through a WiFi wireless access point (WAP) (not shown). The WiFi WAP may be included in enterprise network 120, and/or be part of a local area network, and access enterprise network 120 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. In an embodiment, HSS 270 may store administration information for definition and management of enterprise network resources 140. The administration information may be cached in HSS 270 and/or held in a repository 285. The administration information may be provided to UE 110 and enterprise network 120 to access enterprise network resources 140 as described in reference to FIG. 5A through FIG. 7 below. MME 250 may communicate with HSS 270 through an S6a interface 265. S6a interface 265 may be implemented, for example, using a Diameter protocol.

Repository 285 may be a database implemented as a network or computational device that may store and retrieve administration information associated with the definition and access control of enterprise network resources 140. The administration information may include organization identifiers and tokens associated with the IMSIs of UE 110 as shown in FIG. 2. HSS 270 may access the administration information in repository 285 upon initially encountering a particular IMSI for particular UE 110 as described in reference to FIGS. 5A-5B below. Once initially used, HSS 270 may cache administrative information for future use. A provisioning system (not shown) used by an administrator of private network may interface with repository 285 to provide administration information. Repository 285 may also interface with HSS 270 directly through ePC 210, and/or may interface through enterprise network 120 and/or other networks (not shown).

The administrative information stored within repository 285 may associate the IMSI value of UEs 110 with organization identifiers (orgIDs) and the token(s) associated with the orgIDs. For example, UE 110-1 having an IMSI value of "IMSI1," may be associated with an organization having an identifier "orgID11." Based on data in repository 285 as shown in FIG. 2, UE 110-1 can be provided with L tokens: token11, . . . , token 1L. These tokens may define and authorize access to enterprise network resources 140 in enterprise network 120-1. The tokens may be provided to enterprise network 120-1 in the form of enhanced PLMNs. Thus, when UE 110-1 joins (e.g., attaches) to enterprise network 120-1 via network proxy 150, UE 110 may present the enhanced PLMN to network proxy 150, and network proxy 150 (which also is provisioned with the tokens for the organization associated with enterprise network 120-1) may identify the enhanced PLMN provided by UE 110 and authorize the appropriate enterprise network resource(s) 140.

Because UE 110 and network proxy 150 store the token, access to enterprise network resources 140 in enterprise network 120 may be controlled without having to rely on provider network 130. The token may also allow easy movement of users (i.e., UEs 110) among enterprise networks 120, and further allows easy provisioning of UEs 110 by administrators of enterprise network 120. Embodiments permit the provisioning of a UE 110 within enterprise network 120 based on the token and not the IMSI, which gives administrators the ability to provision enterprise network 120 without having to use an administrator of provider network 130.

The tokens may be formatted, for example, as 2- or 3-digit scalar values similar to mobile network codes (MNC) used in PLMNs. Alternatively, the tokens may take on multiple numerical values such as a range of values and may be formatted as vector quantities. The tokens may be classified into different types. One type of token may be referred to as a static token which may be valid and remain unchanged for long periods of time. For example, a static token may be used to provide access to enterprise network resource(s) 140 for a long-term employee. Another type of token may be a dynamic token, which may be valid for shorter periods of time. For example, a dynamic token may be used to provide access to enterprise network resources (s) 140 for a short-term employee. The tokens may operate in the control plane, and thus identify the enterprise network 120 identifier, a quality of service (QoS), latency, bandwidth and other network performance parameters.

In an embodiment, the tokens may be based on time durations and/or geographic positions (e.g., UE 110 position coordinates based on the global positioning system (GPS)). The tokens may be revoked by an enterprise network 120 administrator (with or without notification to the user of UE 110) or by UE 110 itself. A UE 110 may use multiple tokens separately or in combination to access multiple resources. Additionally or alternatively, a single token may be hierarchical and provide multiple resource access (e.g. access a secure device within an access controlled room or environment).

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment is in accordance with a user's subscription profile based, for example, on a specified quality of service (QoS) class identifier (QCI). PCRF 290 may communicate with PGW 280 using a Gx interface 280. Gx interface 280 may be implemented, for example, using a Diameter protocol.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
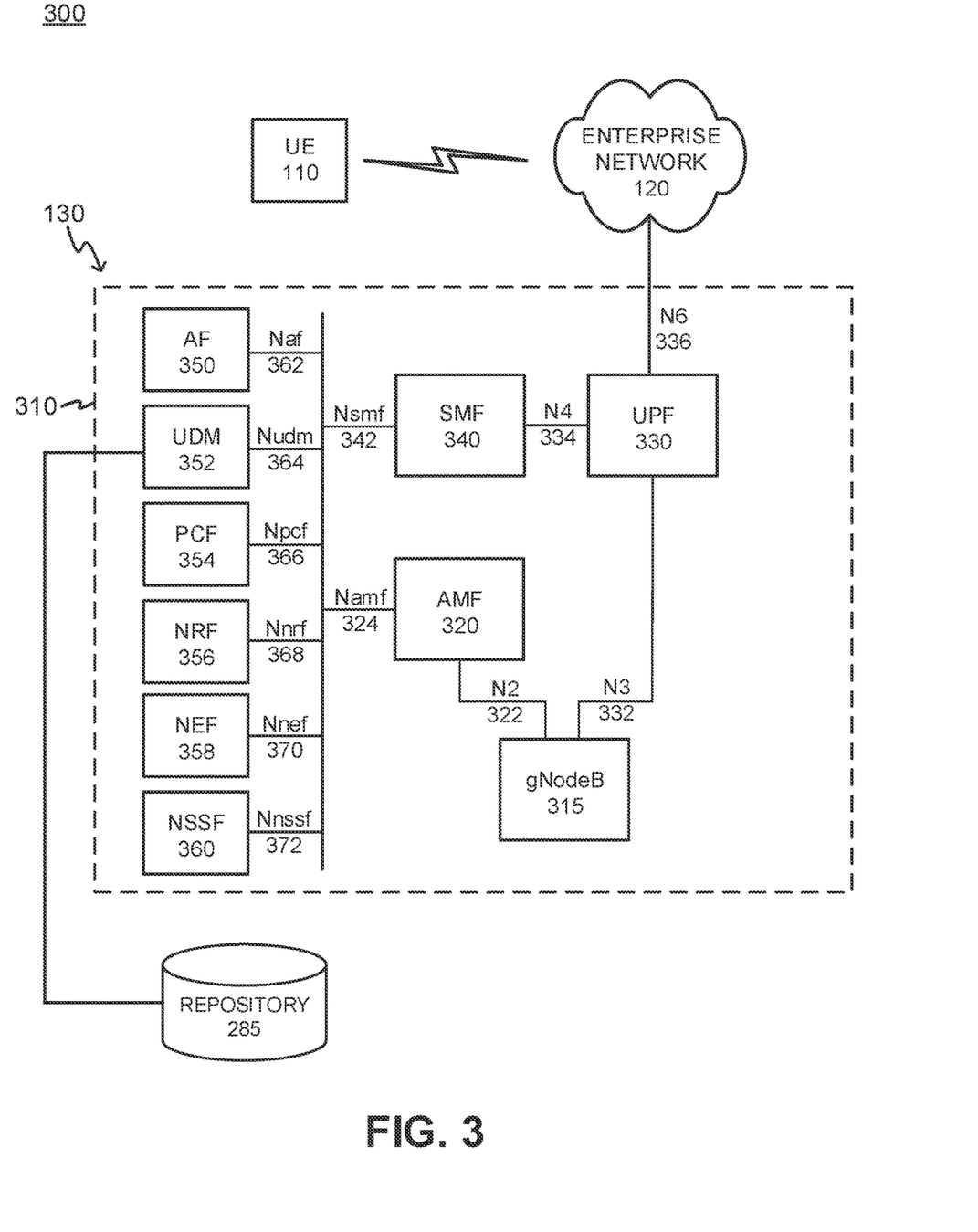
FIG. 3 is a block diagram of an exemplary system having the provider network based on a 5G standard.

FIG. 3 is a block diagram of an exemplary networking system 300 having a provider network 130 based on a 5G standard. As shown in FIG. 3, system 300 may include UE 110, 5G NR core 310, gNodeB 315, enterprise network 120, and repository 285. In the embodiment shown in FIG. 3, UE 110 may wirelessly connect with enterprise network 120 to exchange data over a RAT based on 5G NR air channel interface protocols. UE 110 may also connect wirelessly with gNodeB 315 over a RAT based on 5G NR air channel interface protocols. Networking system 300 may further include an Internet Protocol (IP) network and/or a non-IP network, which may be embodied separately or included in a WAN and/or backhaul network (not shown). 5G NR core 310 may also be connected to a repository 285 which may store tokens and organization identifiers (orgIDs) associated with international mobile subscriber identities (IMSIs) of UEs 110. Details of repository 285 are similar to the embodiment described in FIG. 2, and will not be repeated in the description of FIG. 3.

Provider network 130 may include a gNodeB 315 (corresponding to base station 130), an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 315, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 315, AMFs 320, UPFs 330, SMFs 340, AFs 350, UDMs 352, PCFs 354, NRFs 356, NEFs 358, and NSSFs 360.

GNodeB 315 may include one or more devices (e.g., base stations) and other components and functionality that enable UE 110 to wirelessly connect to provider network 130 using 5G NR RAT. For example, gNodeB 315 may include one or more cells, with each cell including a wireless transceiver with an antenna array configured for millimeter-wave wireless communication. GNodeB 315 may implement one or more RAN slices to partition provider network 130. GNodeB 315 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP provider network 130, and/or other types of management processes. In some implementations, AMF 320 may implement some or all of the functionality of managing RAN slices in gNodeB 315. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., enterprise network 120), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 315), and/or perform other types of user plane processes. UPF 330 may communicate with SMF 340 using an N4 interface 334 and connect to enterprise network 120 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 364. Repository 285, described above, may interface with UDM 352 directly through provider network 130, or through enterprise network 120.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to enterprise network 120. Furthermore, NEF 358 may secure provisioning of information from external applications to provider network 130, translate information between provider network 130 and devices/networks external to provider network 130, support a Packet Flow Description (PFD) function, and/or perform other types of network exposure functions. NEF 358 may be accessible via Nnef interface 370.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 315. NSSF 360 may be accessible via Nnssf interface 372.

Although FIG. 3 shows exemplary components of provider network 130, in other implementations, provider network 130 may include fewer components, different components, differently arranged components, or additional components than depicted in FIG. 3. Additionally or alternatively, one or more components of provider network 130 may perform functions described as being performed by one or more other components of provider network 130. For example, provider network 130 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, provider network 130 may include a reference point architecture that includes point-to-point interfaces between particular function nodes.

Figure 4:
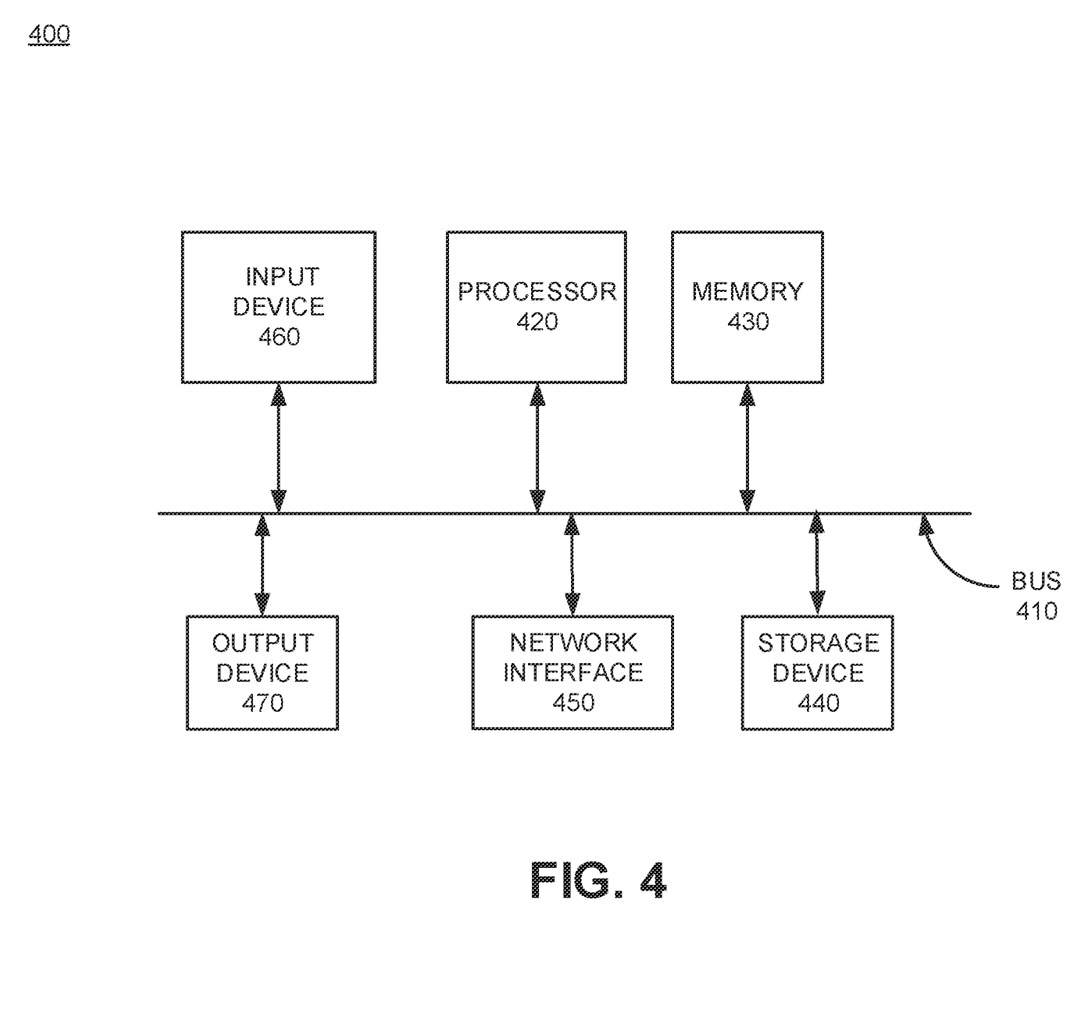
FIG. 4 is a block diagram showing exemplary components of a network device within the provider network and/or private network according to an embodiment.

FIG. 4 is a block diagram showing exemplary components of a network device 400 according to an embodiment. Network device 400 may be included or implemented one or more network elements illustrated in FIGS. 1-3. For example, in provider network 130, network device 400 may be implemented in various elements in ePC 210 and/or 5G NR core 310, such as, for example, MME 250, AMF 320, HSS 270, and/or UDM 352. In enterprise network 120, network proxy 150 may include a network device 400. UE 110 may also include network device 400. In some embodiments, there may be a plurality of network devices 400 providing functionality of one or more network elements. Alternatively, one network device 400 may perform the functionality of any plurality of network elements. Network device 400 may include a bus 410, a processor 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities that are communicatively coupled to enterprise network 120.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 400 to communicate with other devices and/or systems in network environment 100. Network interface 450 may be configured to exchange data with enterprise network 120 over wired communications (e.g., conductive wire, twisted pair cable, coaxial cable, transmission line, fiber optic cable, and/or waveguide, etc.), or a combination of wireless. In other embodiments, network interface 450 may interface with enterprise network 120 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to defining and authorizing services within a private network based on enhanced PLMN identifiers. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5A-5B and the flow charts shown in FIG. 6 and/or FIG. 7.

Although FIG. 4 shows exemplary components of network device 400, in other implementations, network device 400 may include fewer components, different components, additional components, or differently arranged components than depicted in FIG. 4.

Figure 5A:
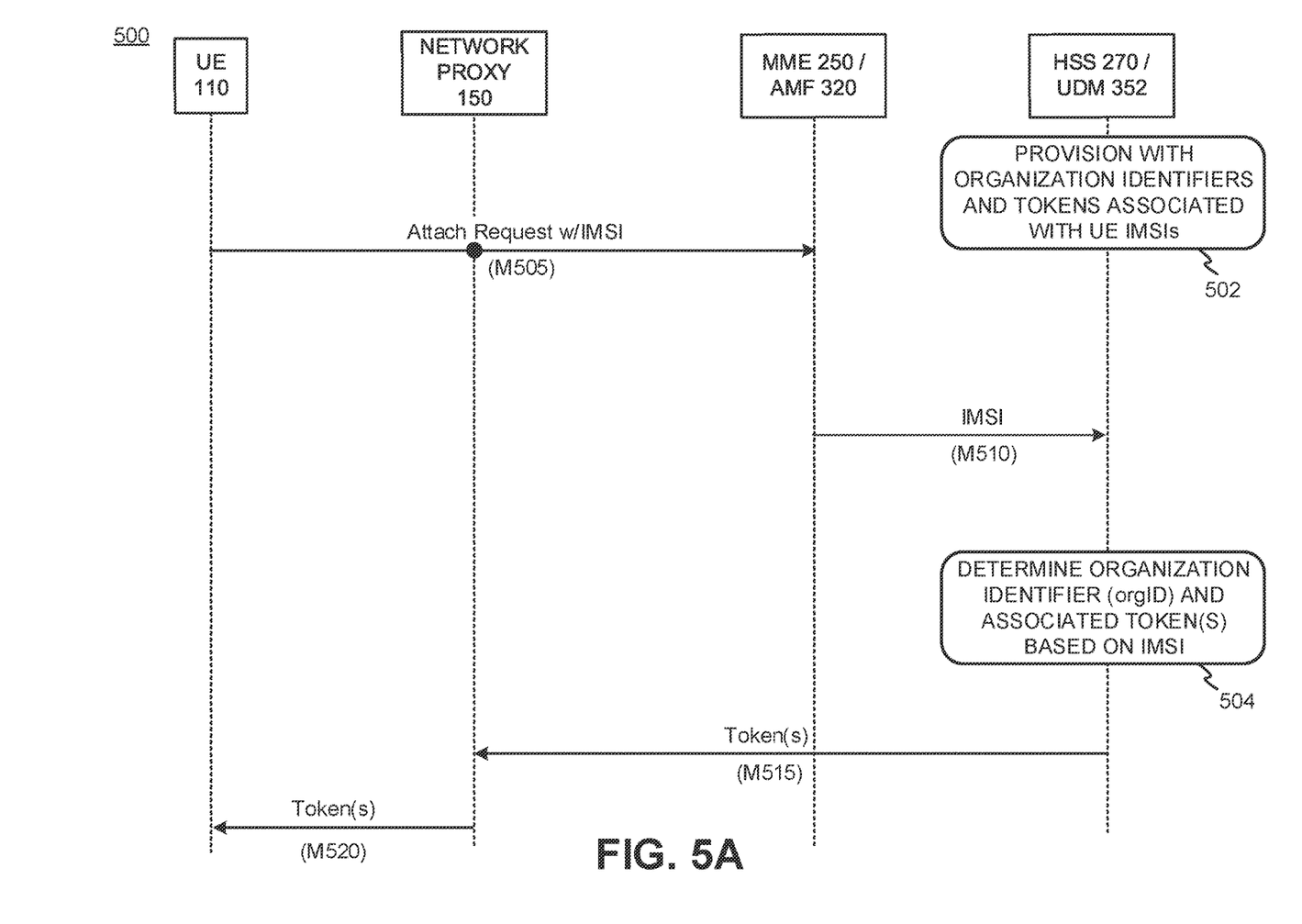
FIG. 5A is a diagram showing exemplary message flows for provisioning a user equipment device (UE) and network proxy with tokens for access to resources in a private network.
Figure 5B:
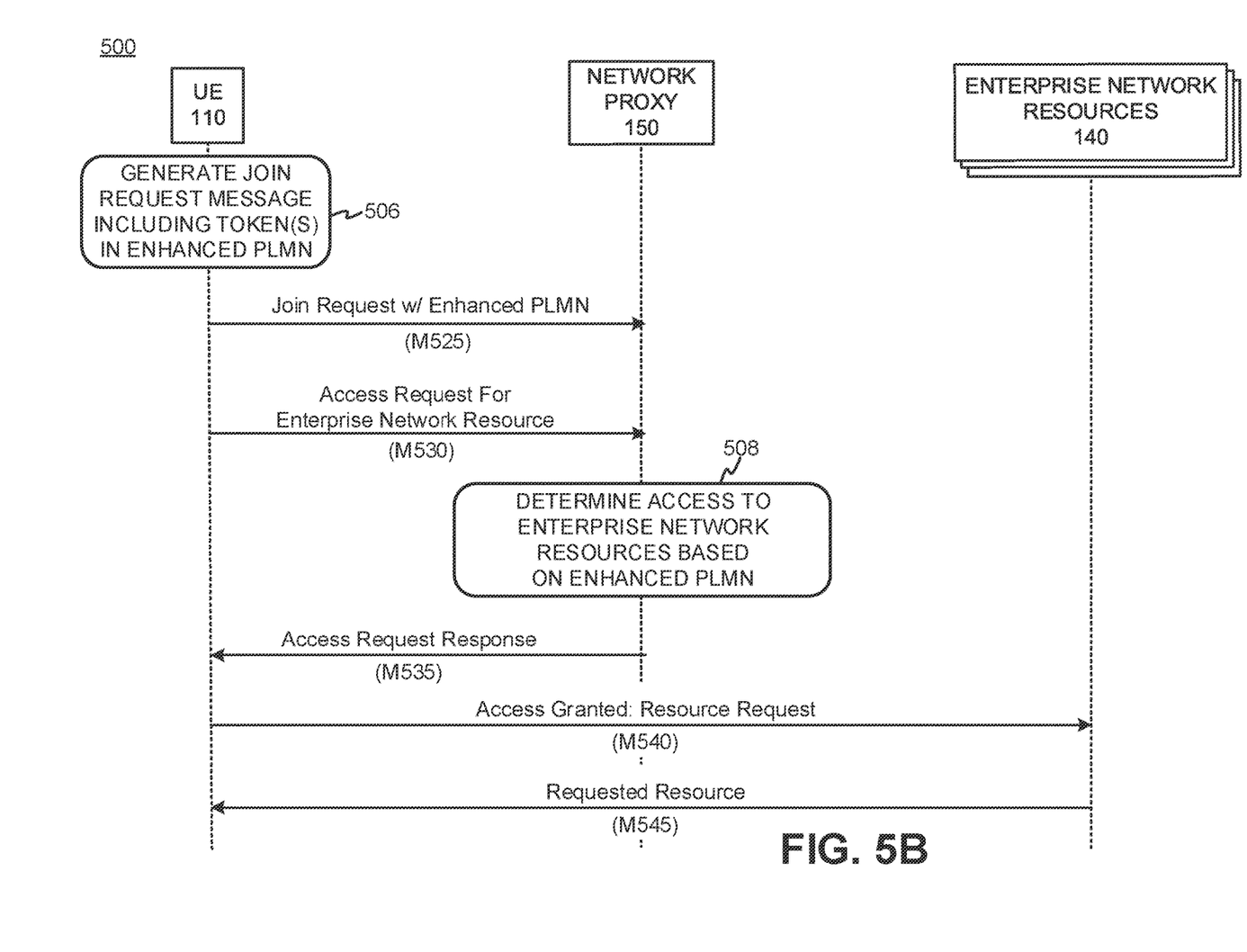
FIG. 5B is diagram showing exemplary message flows for resource definition and/or authorization based on the token(s) received from the provider network.

FIGS. 5A-5B are diagrams showing exemplary message flows 500 within a networking environment 100 for defining and granting access to services in a private network (e.g., enterprise network 120) based on an enhanced PLMN. The message flow diagrams show network components which may correspond both LTE and 5G network standards. The LTE components are shown with the label "2XX" and the 5G components are shown with the label "3XX." For example, as shown in FIG. 5A, the mobility managers are shown as "MME 250/AMF 320."

FIG. 5A shows exemplary messaging flows for provisioning the UE 110 and network proxy 150 with tokens which may define/authorize access to resources in enterprise network 120. Provisioning of various network elements may occur prior to the exchange of messages to facilitate service definition/authorization in enterprise network 120. For example, in Block 502, HSS 270/UDM 352 may be provisioned with orgIDs and tokens associated with the IMSIs of UEs 110. In one implementation, the source of provisioning data may obtained from repository 285. The repository 285 may be populated with orgIDs and token data provided by enterprise administrators in advance of communications involving UEs 110.

UE 110 may begin an initial attach procedure with provider network 130 by sending an attach request to MME 250/AMF 320 (M505). The attach request may be sent through enterprise network 120, via network proxy 150, to MME 250/AMF 320. The attach request M505 may include an IMSI identifying the user/subscriber associated with UE 110. Upon receiving the attach request M505, MME 250/AMF 320 may forward the IMSI to HSS 270/UDM 352 (M510). Once the IMSI is received, HSS 270/UDM 352 may determine the orgID and associated token(s) based upon the IMSI provided in message M510 (Block 504). This determination may be performed with look-up tables stored in HSS 270/UDM 352 and/or by accessing repository 285. Once the orgID and token(s) are identified, the token(s) may be sent to network proxy 150 in enterprise network 120 (M515). Network proxy 150 may cache the token(s) and use the token(s) for resource definition and/or authorization. The network proxy 150 may forward the token(s) to UE 110 for subsequent use (M520) as described in reference to FIGS. 5B and 7.

FIG. 5B shows exemplary messaging flows for resource definition and/or authorization based on the token(s) received from provider network 130. UE 110 may initially generate a join request message (e.g., an attach request) which may include the token(s) as an enhanced PLMN (Block 506). A token may take the form of a mobile network code (MNC) value, or may be a range of values. Token(s) may be used as the enhanced PLMN value for use in the join request message (e.g., an attach request) to join enterprise network 120. UE 110 may send the join request message, including the enhanced PLMN, to network proxy 150 (M525). The enhanced PLMN may be cached by network proxy 150 for use in defining what enterprise network resources 140 UE 110 has permission to access. After UE 110 has joined (e.g., attached to) enterprise network 120, UE 110 may send a message to network proxy 150 requesting access to one or more enterprise network resources 140 (M530). Based upon the enhanced PLMN of UE 110 included in message 525, network proxy 150 may determine whether UE 110 has access to the requested enterprise network resource(s) 140 (Block 508). Once the determination is made, network proxy 150 may send an access request response to UE 110 (M535). The access request response M535 provides status to UE 110 indicating whether access to the enterprise network resources 140 requested in M535 has been granted or denied. If the access is granted, UE 110 may send a resource request to the approved enterprise network resource(s) 140 (M540). In response, enterprise network resource 140 may provide the requested resource or access to the requested resource to UE 110 (M545).

Figure 6:
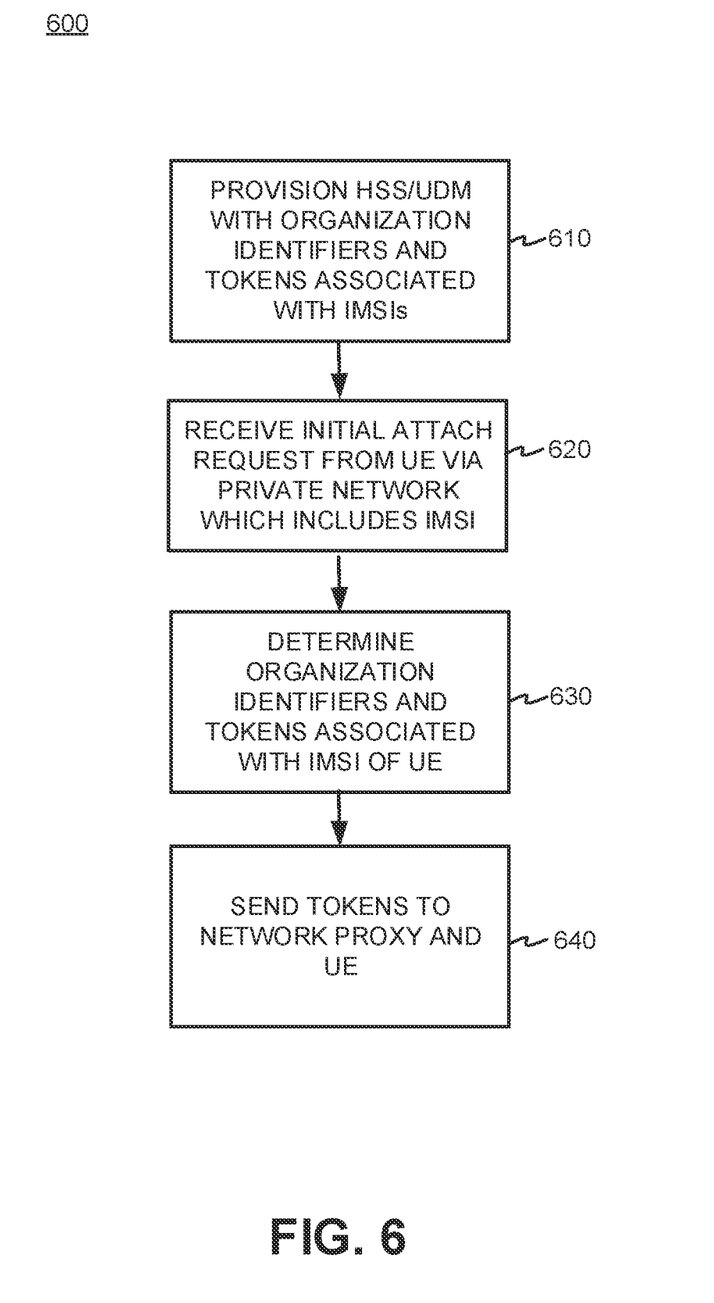
FIG. 6 is a flow chart showing an exemplary process for provisioning the UE and network proxy with tokens for access to resources in the private network.

FIG. 6 is a flow chart showing an exemplary process 600 for provisioning UE 110 and network proxy 150 with tokens for access to resources in a private network (e.g., enterprise network 120). Process 600 may be performed by network device 400, having processor 420 executing instructions stored in memory 430 and/or stored in storage device 440. Network device 400 may be implemented in one or more devices such as HSS 270 and/or MME 250 in LTE networks, and/or UDM 352 and/or AMF 320 in 5G networks. Alternatively, network device 400 may be implemented in one or more devices in enterprise network 120. Network device 400 may be embodied as a single device performing multiple network functions, or as separate network devices each performing specific network functions.

Prior to UE 110 accessing enterprise network 120 and/or provider network 130, processor 420 may initially provision operations in provider network 130. For example, processor 420 may receive organization identifiers (orgIDs) and tokens associated with IMSI values of UEs 110 (Block 610). The orgIDs and tokens may be received from repository 285. Processor 420 may establish in HSS 270 (for 4G) or in UDM 352 (for 5G) associations between the orgIDs and associated token(s) with IMSI values. In an embodiment, multiple tokens may be structured in a hierarchical manner to access enterprise network resources 140 that may be interrelated. For example, enterprise network resources 140 having multiple layers of security may use hierarchical tokens. Additionally or alternatively, a single token may also represent a numerical range and be used to authorize access distinct enterprise network resources 140 which are related in some manner. For example, a token having a numerical range could be used to grant access to a single room that has multiple entrances, where each entrance is represented by a single numerical value in the range. In another implementation, tokens may include different types or classes of tokens. For example, static tokens may be associated with UE 110 over a long period of time. Dynamic tokens may be associated with UE 110 for a short period of time.

Once one or more network elements in provider network 130 have been provisioned, processor 420 may receive an initial attach request from UE 110 via a private network (e.g., enterprise network 120) which includes the IMSI of UE 110 (Block 620). Processor 420 may receive an IMSI value of UE 110 during the initial attach process (Block 630). Once the IMSI of UE 110 is received, processor 420 may determine, based on the IMSI, the orgID and one or more tokens associated with the private network (Block 630). In an embodiment, a token may be included in an enhanced PLMN for granting UE 110 access to resources in the private network (e.g., enterprise network 120). Processor 420 may send one or more tokens to UE 110 and the network proxy 150 within the private network (Block 640).

In an embodiment, token(s) may determine access to service levels within the private network. The service levels may include quality of service, latency, and/or bandwidth. The tokens may also determine access to network devices and services within the private network. The services may include physical access control, location services, advertising services, and/or UE 110 application control. The tokens may also identify user classes which include, for example, employees, customers, managers, and/or maintenance staff. Additionally, physical access control may be based on the user class. When UE 110 attaches to the private network, UE 110 may use an enhanced PLMN which includes one or more tokens, as described below.

Figure 7:
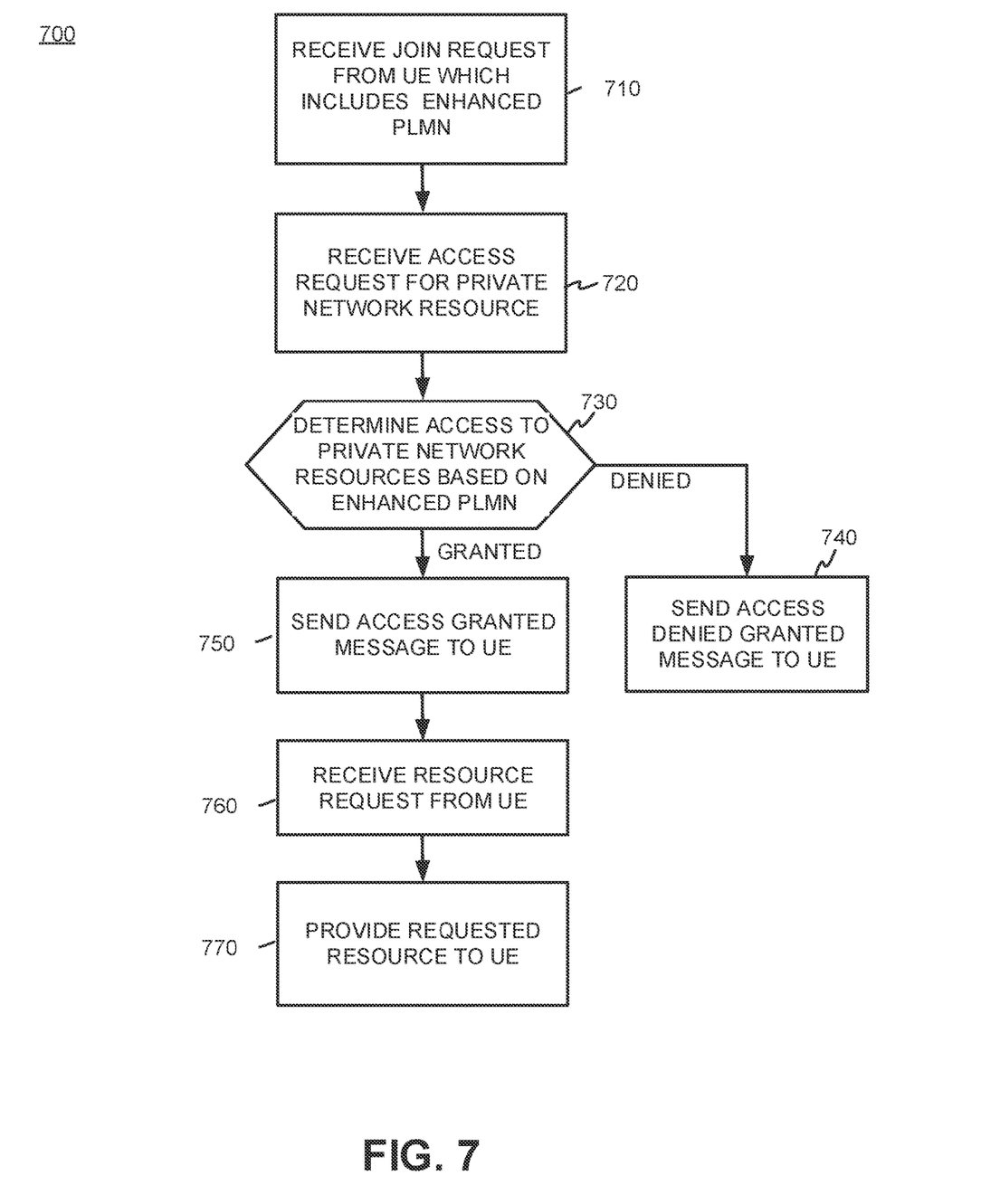
FIG. 7 is a flow chart showing an exemplary process for resource definition and/or authorization based on the token(s) received from the provider network.

FIG. 7 is a flow chart showing an exemplary process 700 for resource definition and/or authorization based on the token(s) received from provider network 130. Process 700 may be performed by network proxy 150 implemented via network device 400, having processor 420 executing instructions stored in memory 430 and/or stored in storage device 440.

Processor 420 may initially receive a join request (e.g., attach request) from UE 110 which includes the enhanced PLMN (Block 710). Processor 420 may receive an access request for one or more private network resource(s) (e.g., enterprise network resource(s) 140) (Block 720). Processor 420 may determine whether UE 110 should be granted access to the private network resource based on the enhanced PLMN (Block 730). If the access is denied, processor 410 sends a message to UE 110 denying access to the private network resource (Block 740). If in Block 730 access to the private network resource is granted, processor 420 may send a message to UE 110 indicating that access has been granted (Block 750).

In an embodiment where network proxy 150 coordinates resource requests, processor 420 may receive a resource request from UE 110 (Block 760). Processor 420, coordinating with the request for private network resources (e.g., enterprise network resources 140), may direct or provide the requested resources to UE 110 (Block 770). For example, network proxy 150 may act as an intermediary for supplying the requested resource, or access to the requested resource, by directing UE 110 to the appropriate address (e.g., an access point name (APN)) so UE 110 may communicate directly with the private network resource to fulfill the resource request.

Process 700 shown in FIG. 7 illustrates exemplary acts network proxy 150 may perform to grant access to private network resource(s) based on an enhanced PLMN which includes token(s) received from provider network 130. In an alternative embodiment, the tokens may be generated and received via enterprise network 120.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 5A, 5B, 6, and 7, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out"

processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, from a user equipment (UE) device via a private network, an attach request that includes a UE device identity (ID) value;
   determining, based on the UE device ID value, a token from a non-private network, wherein the token grants the UE device access to resources in the private network, and wherein the token is one of a static token that is associated with the UE device over a first period of time, or a dynamic token that is associated with the UE device over a second period of time that differs from the first period of time; and
   sending the token to the UE device and a network proxy device within the private network.

2. The method of claim 1, wherein the UE device ID value comprises an international mobile subscriber identity (IMSI) value.

3. The method of claim 1, wherein the first period of time is longer than the second period of time.

4. The method of claim 1, wherein the token determines access to service levels within the private network, wherein the service levels define at least one of quality of service, a latency, or a bandwidth.

5. The method of claim 1, wherein the token determines access to services within the private network, wherein the services include at least one of physical access control, location services, advertising services, or UE application control.

6. The method of claim 1, wherein the token identifies user classes associated with length-of-term differentiated employees, and further wherein physical access control is based on an associated user class.

7. The method of claim 1, wherein the non-private network comprises an enhanced public land network (PLMN), and wherein the UE device attaches to the private network based on the enhanced PLMN and without reliance upon a provider network.

8. A device, comprising:
   a processor configured to:
      receive, from a user equipment (UE) device via a private network, an attach request that includes a UE device identity (ID) value;
      determine, based on the UE device ID value, a token from a non-private network, wherein the token grants the UE device access to resources in the private network, and wherein the token is one of a static token that is associated with the UE device over a first period of time, or a dynamic token that is associated with the UE device over a second period of time that differs from the first period of time; and
      send the token to the UE device and a network proxy device within the private network.

9. The device of claim 8, wherein the UE device ID value comprises an international mobile subscriber identity (IMSI) value.

10. The device of claim 8, wherein the first period of time is longer than the second period of time.

11. The device of claim 8, wherein the token determines access to service levels within the private network, wherein the service levels define at least one of quality of service, a latency, or a bandwidth.

12. The device of claim 8, wherein the token determines access to services within the private network, wherein the services include at least one of physical access control, location services, advertising services, or UE application control.

13. The device of claim 8, wherein the token identifies user classes associated with length-of-term differentiated employees, and further wherein physical access control is based on an associated user class.

14. The device of claim 8, wherein the non-private network comprises an enhanced public land network (PLMN), and wherein the UE device attaches to the private network based on the enhanced PLMN and without reliance upon a provider network.

15. A non-transitory computer-readable medium comprising instructions, which, when executed by a processor, cause the processor to:
   receive, from a user equipment (UE) device via a private network, an attach request that includes a UE device identity (ID) value;
   determine, based on the UE device ID value, a token from a non-private network, wherein the token grants the UE device access to resources in the private network, and wherein the token is one of a static token that is associated with the UE device over a first period of time, or a dynamic token that is associated with the UE device over a second period of time that differs from the first period of time; and
   send the token to the UE device and a network proxy within the private network.

16. The non-transitory computer-readable medium of claim 15, wherein the first period of time is longer than the second period of time.

17. The non-transitory computer-readable medium of claim 15, wherein the token determines access to service levels within the private network, wherein the service levels define at least one of quality of service, a latency, or a bandwidth.

18. The non-transitory computer-readable medium of claim 15, wherein the token determines access to services within the private network, wherein the services include at least one of physical access control, location services, advertising services, or UE application control.

19. The non-transitory computer-readable medium of claim 15, wherein the token identifies user classes associated with length-of-term differentiated employees, and further wherein physical access control is based on an associated user class.

20. The non-transitory computer-readable medium of claim 15, wherein the non-private network comprises an enhanced public land network (PLMN), and wherein the UE device attaches to the private network based on the enhanced PLMN and without reliance upon a provider network.

* * * * *